(12) United States Patent
Kim et al.

(10) Patent No.: US 12,360,221 B2
(45) Date of Patent: Jul. 15, 2025

(54) ELECTRONIC DEVICE AND METHOD FOR COMPENSATING FOR DEPTH ERROR ACCORDING TO MODULATION FREQUENCY

(71) Applicant: Samsung Electronics Co., Ltd., Gyeonggi-do (KR)

(72) Inventors: Ilyoung Kim, Gyeonggi-do (KR); Johngy Lee, Gyeonggi-do (KR); Hojong Kim, Gyeonggi-do (KR); Jaeyoung Huh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 911 days.

(21) Appl. No.: 17/493,117

(22) Filed: Oct. 4, 2021

(65) Prior Publication Data

US 2022/0091241 A1   Mar. 24, 2022

Related U.S. Application Data

(63) Continuation of application No. PCT/KR2020/003858, filed on Mar. 20, 2020.

(30) Foreign Application Priority Data

Apr. 4, 2019   (KR) .................. 10-2019-0039398

(51) Int. Cl.
*G01C 3/08*     (2006.01)
*G01S 7/4913*   (2020.01)
(Continued)

(52) U.S. Cl.
CPC ............ *G01S 7/4913* (2013.01); *G01S 7/497* (2013.01); *G01S 17/26* (2020.01); *H04N 23/56* (2023.01)

(58) Field of Classification Search
CPC ........ G01S 7/4913; G01S 7/497; G01S 17/26; H04N 23/56
See application file for complete search history.

(56) References Cited

U.S. PATENT DOCUMENTS 7,209,071 B1   4/2007   Boring
RE45,061 E     8/2014   Karr
(Continued)

FOREIGN PATENT DOCUMENTS

EP    3 370 078        9/2018
KR    1020050014051    2/2005
(Continued)

OTHER PUBLICATIONS

International Search Report dated Jul. 6, 2020 issued in counterpart application No. PCT/KR2020/003858, 5 pages.
(Continued)

*Primary Examiner* — Mark Hellner
(74) *Attorney, Agent, or Firm* — The Farrell Law Firm, P.C.

(57) ABSTRACT

An electronic device includes a communication circuit, a light source for emitting light of set frequencies, an image sensor for acquiring reflected light of the emitted light, a memory for storing offset values for respective reference frequencies of the set frequencies, and a processor. The processor is configured to receive a distance measurement input, identify whether the communication circuit is activated, determine that, in response to identification that the communication circuit is activated, a first frequency distinguished from a frequency used by the activated communication circuit is a frequency of the emitted light among the configured frequencies, acquire information on a distance between the electronic device and an external object, based on the reflected light of the emitted light of the first frequency, and acquire corrected distance information by
(Continued)

applying an offset of the first frequency to the acquired distance information.

20 Claims, 7 Drawing Sheets

(51) Int. Cl.
*G01S 7/497* (2006.01)
*G01S 17/26* (2020.01)
*H04N 23/56* (2023.01)

(56) References Cited

U.S. PATENT DOCUMENTS

| | | | |
|---|---|---|---|
| 9,250,714 | B2 | 2/2016 | Hiromi et al. |
| 9,325,920 | B2 | 4/2016 | Van Nieuwenhove et al. |
| 10,230,934 | B2 | 3/2019 | Krupka |
| 2006/0247526 | A1 | 11/2006 | Lee et al. |
| 2014/0049635 | A1* | 2/2014 | Laffargue ............... G01F 17/00 348/135 |
| 2016/0234008 | A1 | 8/2016 | Hekstra et al. |
| 2018/0131398 | A1* | 5/2018 | Shiu ..................... H04B 15/06 |
| 2018/0136713 | A1 | 5/2018 | Kim et al. |

FOREIGN PATENT DOCUMENTS

| | | |
|---|---|---|
| KR | 1020050087174 | 8/2005 |
| KR | 1020070038458 | 4/2007 |
| KR | 101580407 | 12/2015 |
| KR | 1020180055143 | 5/2018 |

OTHER PUBLICATIONS

Written Opinion dated Jul. 6, 2020 issued in counterpart application No. PCT/KR2020/003858, 4 pages.
European Search Report dated Apr. 14, 2022 Issued in counterpart application No. 20783071.2-1206, 10 pages.
KR Notice of Patent Grant dated May 19, 2025 issued in counterpart application No. 10-2019-0039398, 4 pages.

* cited by examiner

ELECTRONIC DEVICE AND METHOD FOR COMPENSATING FOR DEPTH ERROR ACCORDING TO MODULATION FREQUENCY

CROSS-REFERENCE TO RELATED APPLICATION(S)

This application is a bypass continuation application of PCT/KR2020/003858, filed on Mar. 20, 2020, in the Korean Intellectual Property Office, which is based on and claims priority to Korean Patent Application No. 10-2019-0039398, filed on Apr. 4, 2019, in the Korean Intellectual Property Office, the disclosures of which are incorporated by reference herein in their entireties.

BACKGROUND

1. Field

The disclosure relates generally to an electronic device and a method for compensating for a depth error according to a modulation frequency.

2. Description of Related Art

An electronic device may convert a time from light emission to an external object through a light source to reception of the light reflected from the external object by an image sensor into a distance and acquire information on the distance between the electronic device and the external object. The electronic device may include a time of flight (ToF) module to acquire the information on the distance to the external object.

An electronic device may communicate with an external electronic device through a communication module. A frequency used by the communication module may correspond to a frequency used by the ToF module. When communication and the distance acquisition are performed at the same time, the communication sensitivity of the electronic device may be impeded and/or an error of the distance acquisition may increase.

Accordingly, a scheme for preventing deterioration of the communication sensitivity and reducing the error of the distance acquisition even when the communication and the distance acquisition are performed at the same time is needed.

SUMMARY

The present disclosure has been made to address the above-mentioned problems and disadvantages, and to provide at least the advantages described below.

According to an aspect of the present disclosure, an electronic device includes a communication circuit, a light source for emitting light of set frequencies, an image sensor for acquiring reflected light of the emitted light, a memory for storing offset values for respective reference frequencies of the set frequencies, and a processor. The processor is configured to receive a distance measurement input, identify whether the communication circuit is activated, determine that, in response to identification that the communication circuit is activated, a first frequency distinguished from a frequency used by the activated communication circuit is a frequency of the emitted light among the configured frequencies, acquire information on a distance between the electronic device and an external object, based on the reflected light of the emitted light of the first frequency, and acquire corrected distance information by applying an offset of the first frequency to the acquired distance information.

According to another aspect of the present disclosure, a method of operating an electronic device includes receiving a distance measurement input; identifying whether a communication circuit of the electronic device is activated in response to the distance measurement input; determining that, in response to identification that the communication circuit is activated, a first frequency distinguished from a frequency used by the activated communication circuit is a frequency of light emitted among configured frequencies; acquiring information on a distance between the electronic device and an external object, based on a reflected light of the emitted light of the first frequency; and acquiring corrected distance information by applying an offset value for a reference frequency of the first frequency to the acquired distance information.

According to an aspect of the present disclosure, an electronic device includes a communication circuit, a light source configured to emit lights of configured frequencies, an image sensor configured to acquire reflected lights of the emitted lights, a memory configured to store offset values for reference frequencies of the respective configured frequencies, and a processor. The processor is configured to receive a distance measurement input, identify whether the communication circuit is activated in response to the distance measurement input, determine that, in response to identification that the communication circuit is activated, a first frequency distinguished from a frequency used by the activated communication circuit is a frequency of the emitted light among the configured frequencies, calculate a distance between an external object and the electronic device on the basis of a reflected light of the emitted light of the first frequency, and acquire distance information by applying calibration data for the first frequency to the calculated distance

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
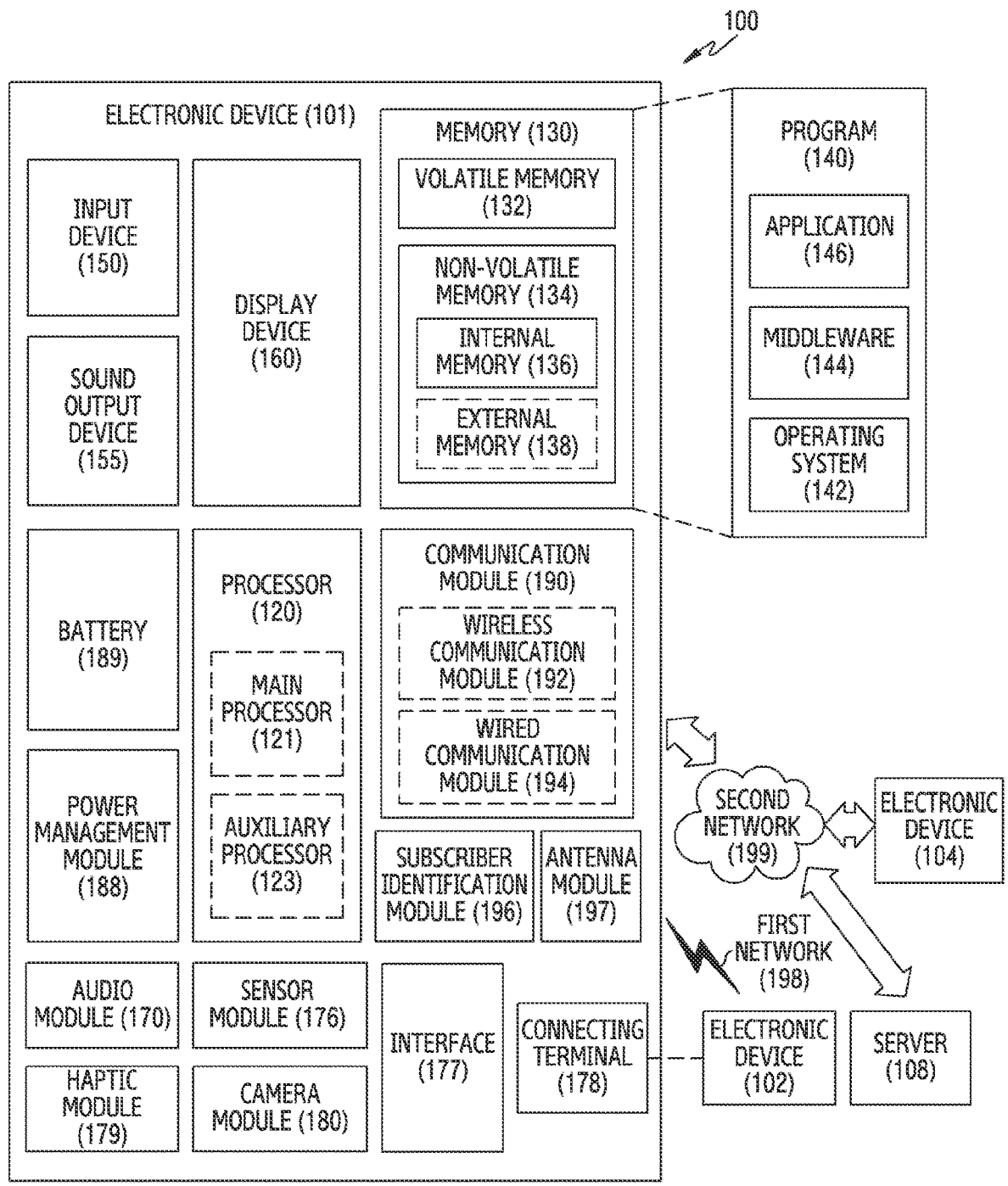
FIG. 1 is a block diagram of an electronic device within a network environment, according to an embodiment.

Various embodiments of the present disclosure are described with reference to the accompanying drawings.

However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments of the present disclosure, an electronic device and a method of operating the same can prevent deterioration of sensitivity of communication and reduce an error in the distance acquisition even when simultaneously performing both communication and distance acquisition.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISP, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
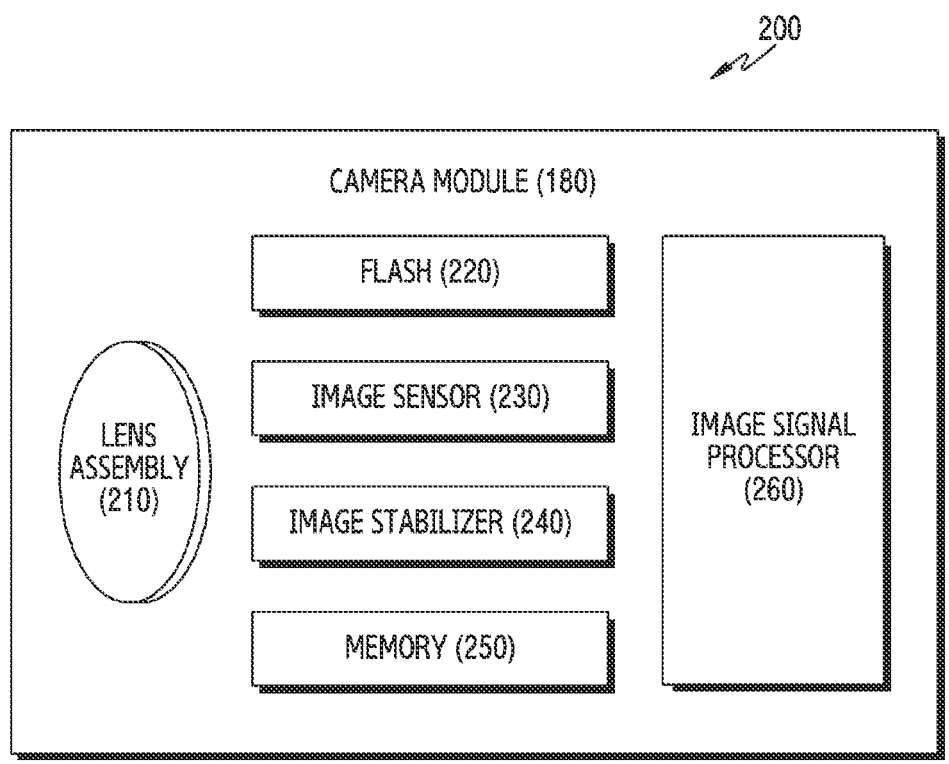
FIG. 2 is a block diagram illustrating a camera module, according to an embodiment.

FIG. 2 is a block diagram 200 illustrating the camera module 180 according to an embodiment. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an IR LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayerpatterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
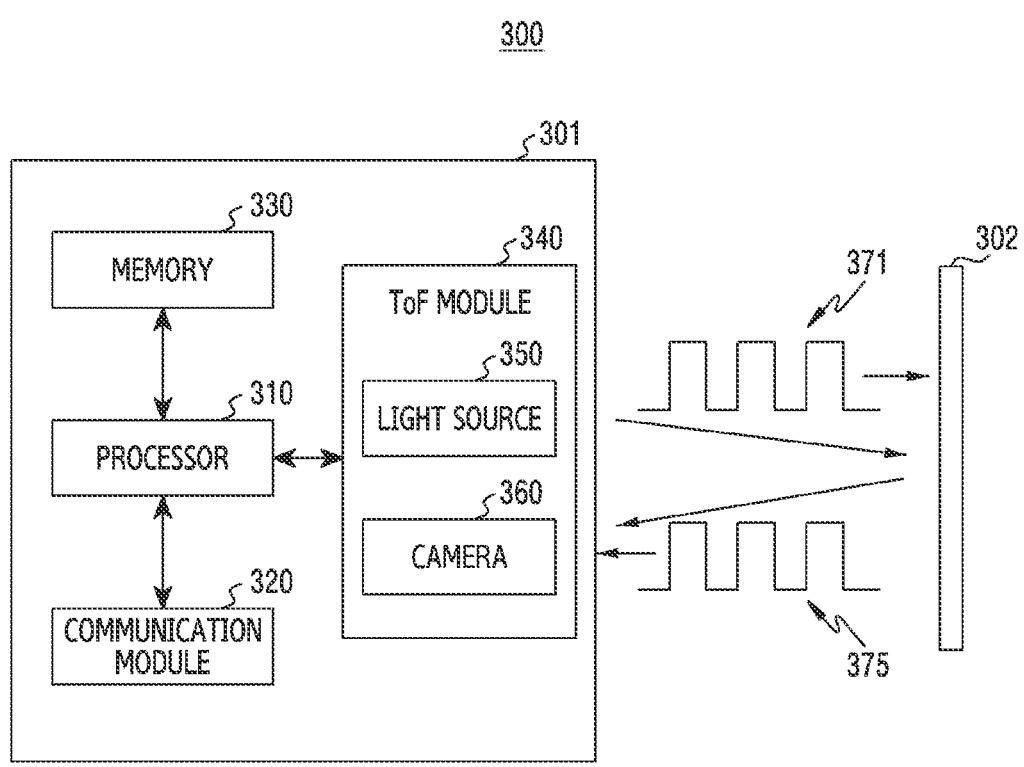
FIG. 3 is a diagram illustrating an example of a functional configuration of the electronic device, according to an embodiment.
Figure 4:
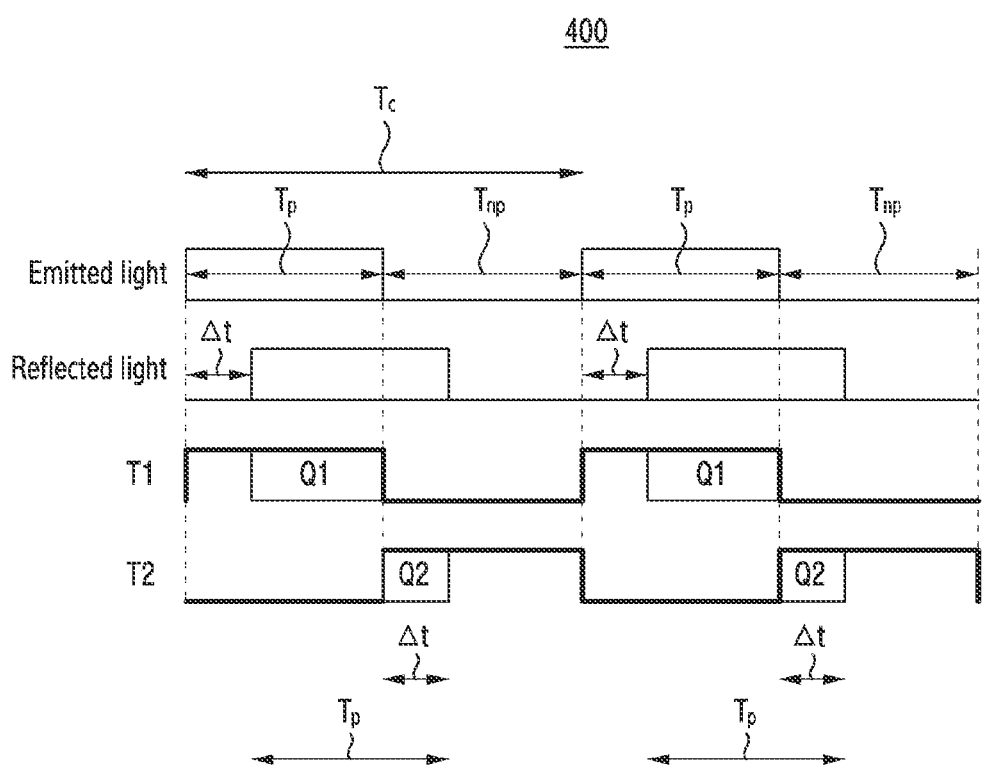
FIG. 4 is a timing diagram illustrating an example of the operation of the electronic device, according to an embodiment.

FIG. 3 is a diagram illustrating an example 300 of the functional configuration of an electronic device 301, according to an embodiment. FIG. 4 is a timing diagram illustrating an example 400 in which an electronic device operates, according to an embodiment.

Referring to FIG. 3, the electronic device 301 includes a processor 310, a communication module 320, a memory 330, a ToF module 340, or a combination thereof.

The processor 310 may control at least one other element (for example, the communication module 320, the memory 330, or the ToF module 340) of the electronic device 301 connected to the processor 310.

The processor 310 may activate the communication module 320 and communicate with an external electronic device through the activated communication module 320.

The processor 310 may activate the ToF module 340 in response to an input of measuring a distance to an external object 302 and acquire information on a distance between the electronic device 301 and the external object 302 through the activated ToF module 340. The input of measuring the distance to the external object 302 may be an input of selecting an object to which the distance is requested to be measured through a screen provided by a predetermined application. The input of measuring the distance to the external object 302 may be an input of executing the predetermined application (for example, a camera application). However, the input of measuring the distance to the external object 302 is not limited thereto.

The processor 310 may identify whether the communication module 320 is activated in response to the input of measuring the distance to the external object 302. When the communication module 320 is activated, the processor 310 may determine a frequency of an emitted light 371 from a light source 350 included in the ToF module 340 on the basis of a frequency used by the communication module 320. The processor 310 may determine that a frequency distinguished from the frequency used by the communication module 320 among a plurality of frequencies of the emitted light 371 which can be emitted using the light source 350 of the ToF module 340 is the frequency of the emitted light 371. The processor 310 may determine the frequency of the emitted light 371 such that the frequency used by the communication module 320 is distinguished from harmonics of the frequency of the emitted light 371.

The processor 310 may acquire information on the distance between the electronic device 301 and the external object 302 on the basis of a time from emission of the emitted light 371 of the determined frequency to the external object 302 through the light source 350 of the ToF module 340 to reception of a reflected light 375 reflected from the external object 302 by the camera 360 of the ToF module 340. The processor 310 may transfer the acquired distance information to an element (for example, an application) which makes a request for the input of measuring the distance to the external object 302.

When the frequency used by the communication module 320 is changed, the processor 310 may change the determined frequency of the emitted light 371. The processor 310 may re-determine that a frequency distinguished from the changed frequency used by the communication module 320 is the frequency of the emitted light 371. The processor 310 may acquire information on the distance to the external object 302 on the basis of the emitted light 371 of the re-determined frequency. The processor 310 may transfer the acquired distance information to an element (for example, an application) which makes a request for the input of measuring the distance to the external object 302.

When calibration data for the frequency of the emitted light 371 used for acquiring the distance information is provided, the processor 310 may not correct the acquired distance information on the basis of the used frequency. The distance information acquired on the basis of the frequency for which the calibration data is provided may indicate a calibration distance.

When calibration data for the frequency of the emitted light 371 used for acquiring the distance information is not provided, the processor 310 may correct the acquired distance information on the basis of an offset value for the used frequency. The processor 310 may acquire corrected distance information by applying the offset value for the frequency (for example, a reference frequency), for which calibration data of the frequency of the emitted light 371 is provided, to the acquired distance information.

The offset value may be an offset value for the frequency (for example, a reference frequency) for which calibration data of each of a plurality of frequencies of the emitted light 371 which can be emitted using the light source 350 is provided. The offset value may be a deviation value between a distance measured by the electronic device 301 for the external object 302 of the reference distance using a predetermined frequency and a distance measured for the external object 302 of the reference distance using the reference frequency. The offset value may be a deviation value between a time at which the electronic device 301 emits the emitted light 371 of the predetermined frequency to a time at which the reflected light 375 from the external object 302 of the reference distance is received and a time at which the emitted light 371 of the reference frequency is emitted to a time at which the emitted light 375 from the external object 302 of the reference distance is received. The offset value based on the deviation value between distances may be referred to as a distance-based offset value, and the offset value based on the deviation value between times may be referred to as a time-based offset value.

The distance-based offset value for the reference frequency of the predetermined frequency may include a distance-based offset value for one reference distance. The distance-based offset value for the reference frequency of the predetermined frequency may include distance-based offset values for a plurality of reference distances.

When the offset value for the reference frequency of the predetermined frequency includes the distance-based offset value for one reference distance, the processor 310 may acquire corrected distance information by applying the corrected distance-based offset value to the acquired distance information according to a ratio between the acquired distance information and the reference distance.

When the reference distance is 20 centimeters (cm), if the distance-based offset value for the reference frequency of the predetermined frequency is 5 cm, the processor 310 may identify that a corrected distance is 20 cm by applying a distance (for example, 25 cm) measured using the predetermined frequency to the offset value (5 cm). When the reference distance is 20 cm, if the distance-based offset value for the reference frequency of the predetermined frequency is 5 cm, the processor 310 may identify that a corrected distance is 40 cm by applying a corrected distance-based offset value (for example, 10 cm) to an offset value measured using the predetermined frequency (50 cm).

When an offset value for a reference frequency of a first frequency includes distance-based offset values for a plurality of reference distances for the reference frequency of the predetermined frequency, the processor 310 may select a distance-based offset value for the reference distance corresponding to the measured distance among the plurality of reference distances, correct the selected distance-based offset value in accordance with a ratio between the acquired distance information and the reference distance, and apply the corrected distance-based offset value to the acquired distance information, so as to acquire corrected distance information. A distance interval corresponding to each of the plurality of reference distances may be configured. Distance intervals corresponding to the plurality of reference distances may not overlap each other.

When reference distances for a predetermined frequency are 20, 40, and 60 cm, distance intervals corresponding to the reference distances are greater than or equal to 0 and less than 30 cm, greater than or equal to 30 and less than 50 cm, and greater than or equal to 50 cm, and when distance-based offset values for the reference frequency of the predetermined frequency of each of the reference distances are 5, 7, and 10 cm, the processor 310 may apply an offset value (5 cm) to a distance (for example, 25 cm) measured using the predetermined frequency to identify a corrected distance as 20 cm.

The time-based offset value for the reference frequency of the predetermined frequency may include a time-based offset value for one reference distance. The time-based offset value for the reference frequency of the predetermined frequency may include time-based offset values for a plurality of reference distances.

When the offset value for the reference frequency of the predetermined frequency includes a time-based offset value for one reference distance, the processor 310 may acquire corrected distance information by applying a time-based offset value corrected in accordance with a ratio between the ToF of the light and the ToF of the light according to the reference distance to the acquired distance information.

When the reference distance is 20 cm and a time-based offset value for a reference frequency of a predetermined frequency is $3.3*10^{-10}$ seconds (sec), the processor 310 may apply the offset value ($3.3*10^{-10}$ sec) to a ToF (for example, $16.5*10^{-10}$ sec) of light measured using the predetermined frequency to identify a corrected TOF of the light as $13.2*10^{-10}$ sec and identify a corrected distance according to the identified ToF as 20 cm ($13.2*10^{-11}$ sec*speed of light*½). When the reference distance is 20 cm and a time-based offset value for a reference frequency of a predetermined frequency is $3.3*10^{-10}$ sec, the processor 310 may apply a corrected time-based offset value ($6.6*10^{-10}$ sec) to a ToF (for example, $33*10^{-10}$ sec) of light measured using the predetermined frequency to identify a corrected TOF of the light as $26.4*10^{-10}$ sec and identify a corrected distance according to the identified ToF as 40 cm ($26.4*10^{-10}$ sec*speed of light*½).

When an offset value for a reference frequency of a first frequency includes time-based offset values for a plurality of reference distances for the reference frequency of the predetermined frequency, the processor 310 may select a time-based offset value for a reference distance corresponding to a ToF of light from among the plurality of reference distances, correct the selected time-based offset value in accordance with a ratio between the ToF of the light and the ToF of the light according to the reference distance, and apply the corrected time-based offset value to the ToF of the light, so as to acquire corrected distance information. Time intervals corresponding to the plurality of reference distances may be configured. The time intervals corresponding to the plurality of reference distances may not overlap each other.

When reference distances for a predetermined frequency are 20, 40, and 60 cm, time intervals corresponding to the reference distances are greater than or equal to 0 and less than $19.8*10^{-10}$ sec, greater than or equal to $19.8*10^{-10}$ and less than $33.3*10^{-10}$ sec, and greater than or equal to $33.3*10^{-10}$ sec, and when time-based offset values for the reference frequency of the predetermined frequency of each reference distance are $3.3*10^{-10}$, $4.6*10^{-10}$, and $6.6*10^{-10}$ sec, the processor 310 may apply the offset value ($3.3*10^{-10}$ sec) to a ToF (for example, $16.5*10^{-10}$ sec) of the light measured using the predetermined frequency to identify a corrected ToF of the light as $13.2*10^{-10}$ sec and identify a corrected distance according to the identified ToF as 20 cm ($13.2*10^{-10}$ sec*speed of light*½).

The communication module 320 may support establishment of a direct (for example, wired) communication channel or a wireless communication channel between the electronic device 301 and an external electronic device. In addition, the communication module 320 may support communication through the established communication channel.

The communication module 320 may perform wireless communication with the external electronic device on the basis of a frequency according to an allocated band.

The ToF module 340 may include a light source 350, a camera 360, or a combination thereof. The ToF module 340 may synchronization the operation of the light source 350 and the operation of the camera 360. The ToF module 340 may generate light of a predetermined frequency through the light source 350. The ToF module 340 may receive the light of the predetermined frequency through the camera 360.

The light source 350 may include one or more light-emitting diodes (for example, an RGB LED, a white LED, an IR LED, or a UV LED), or a xenon lamp. The camera 360 may include an RGB sensor, a BW sensor, an IR sensor, a UV sensor, or a combination thereof. The image sensor included in the camera 360 may be implemented using a CCD sensor, a CMOS sensor, or a combination thereof.

Referring to FIG. 4. the ToF module 340 may emit emitted light 371 of the predetermined frequency on the external object 302 for an emission time $T_p$ of a predetermined cycle $T_c$ through the light source 350. The ToF module 340 may not emit the emitted light 371 for a non-emission time $T_{np}$ of the predetermined cycle $T_c$.

The ToF module 340 may receive a reflected light 375 from the external object 302 for a time corresponding to the emission time $T_p$ through the camera 360. The camera 360 may not receive the reflected light 375 for an interval time corresponding to the non-emission time $T_{np}$ of the predetermined cycle $T_c$. The emission time $T_p$ and the non-emission time $T_{np}$ may have the same time interval (for example, a time interval corresponding to the half of the configured cycle $T_c$).

A time point at which the emitted light 371 is emitted and a time point at which the reflected light 375 is received may have the difference by a time $\Delta t$ corresponding to the distance to the external object 302.

Each of the image sensors included in the camera 360 may include at least two capacitors T1 and T2. The first capacitor T1 may switch from an off state to an on state for the emission time $T_p$ of the predetermined cycle $T_c$ and switch from an on state to an off state for the non-emission time $T_{np}$. The second capacitor T2 may switch from an on state to an off state for the emission time $T_p$ of the predetermined cycle $T_c$ and switch from an off state to an on state for the non-emission time $T_{np}$. At least two capacitors T1 and T2 may accumulate chargers Q1 and Q2 corresponding to light amounts of the reflected light 375 incident while the capacitors are in the on state. The charges accumulated in the two capacitors T1 and T2 may be charges generated in accordance with light received by a photodiode of each image sensor included in the camera 360.

The ToF module 340 may transfer information indicating a distance D between the electronic device 301 and the external object 302 to the processor 310 or transfer information indicating a time difference $\Delta t$ to allow the processor 310 to acquire the information indicating the distance D.

The ToF module 340, the processor 310, or a combination thereof may calculate the distance D between the electronic device 301 and the external object 302 on the basis of Equation (1), below.

$$D = \frac{1}{2} \cdot c \cdot \Delta t = \frac{1}{2} \cdot c \cdot T_p \cdot \frac{Q2}{Q1+Q2} \quad (1)$$

where c denotes a constant (c=3*10⁸ m/s) indicating a speed of light, $\Delta t$ denotes a time difference between a time point at which the emitted light 371 is emitted and a time point at which the reflected light 375 is received, $T_p$ denotes an emission time, Q1 denotes a charge accumulated by the capacitor T1 switching to the on state for the emission time $T_p$, and Q2 denotes a charge accumulated by the capacitor T2 switching to the on state for the non-emission time $T_{np}$.

The ToF module 340 may correct the calculated distance between the electronic device 301 and the external object 302 on the basis of calibration data. A predetermined frequency may be determined as a reference frequency, and the calibration data may include a deviation value between the real distance acquired on the basis of the determined reference frequency and the calculated distance. Each frequency used by the ToF module 340 may be determined as a reference frequency, and the calibration data may include a deviation value between the real distance acquired on the basis of the determined reference frequency and the calculated distance. The calibration data may be stored in the memory 330 and/or the ToF module 340.

Figure 5:
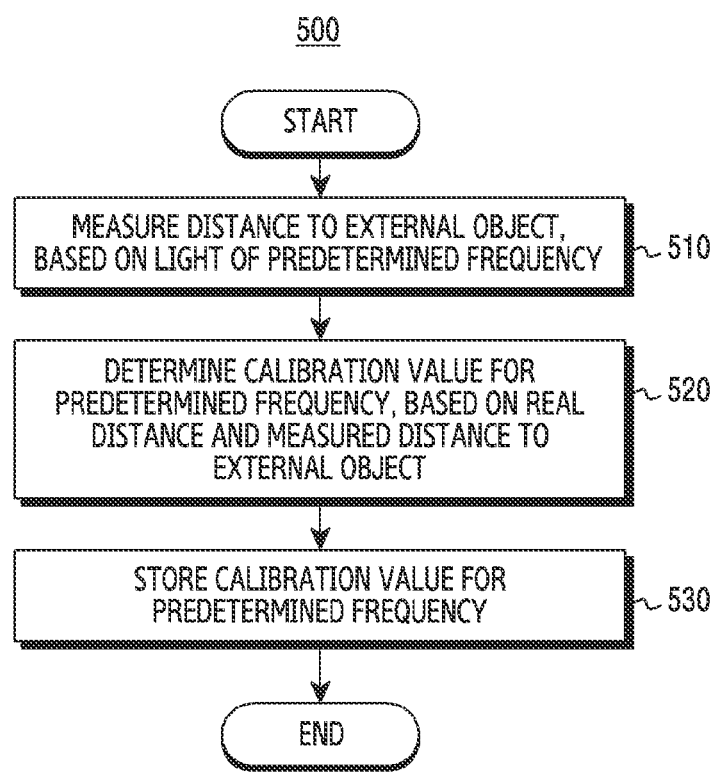
FIG. 5 is a flowchart illustrating the operation of constructing calibration data of the electronic device, according to an embodiment.

FIG. 5 is a flowchart 500 illustrating an operation for constructing calibration data of an electronic device 301, according to an embodiment. A description of FIG. 5 is made with reference to the configuration of the electronic device 301 of FIG. 3.

Referring to FIG. 5, in step 510, a processor 310 of the electronic device 301 measures a distance to an external object 302 spaced apart from the electronic device 301 by a configured distance on the basis of emitted light 371 of a predetermined frequency. The predetermined frequency may be a frequency selected to provide calibration data among a plurality of frequencies of the emitted light 371 which can be emitted using a light source 350.

In step 520, the processor 310 determines a calibration value for the predetermined frequency on the basis of the real distance to the external object 302 and the distance to the external object 302 measured on the basis of the emitted light 371. The processor 310 may determine the calibration value for the predetermined frequency on the basis of the deviation value between the real distance and the measured distance. The processor 310 may determine the calibration value for the predetermined frequency on the basis of the deviation value between the real distance and the measured distance with respect for a plurality of spaced distances between the electronic device 301 and the external object 302.

In step 530, the processor 310 stores the calibration value for the predetermined frequency. The processor 310 may store the calibration value for the predetermined frequency in a memory 330. However, this is only an example, and the calibration value for the predetermined frequency may be stored in advance in a memory provided to a ToF module 340.

In order to provide calibration data for all of a plurality of frequencies of the emitted light 371 which can be emitted, the processor 310 may perform steps 510 to 530 for each of the plurality of frequencies.

The processor 310 may provide calibration data for one reference frequency among the plurality of frequencies of the emitted light 371 which can be emitted. When calibration data for one reference frequency is provided, the processor 310 may perform an operation for acquiring an offset value for the reference frequency of each of the plurality of frequencies.

The processor 310 may measure a distance to the external object 302 spaced apart from the electronic device 301 by a configured distance on the basis of light of the predetermined frequency among the plurality of frequencies. The processor 310 may control the measured distance on the basis of calibration data for the reference frequency. The processor 310 may determine a deviation value between the controlled distance and the real distance as an offset value for the reference frequency of the predetermined frequency. For each of the plurality of spaced distances between the electronic device 301 and the external object 302, the processor 310 may acquire the deviation value between the real distance and the controlled distance as the offset value for the reference frequency of the predetermined frequency. The offset value acquired on the basis of the deviation value between the real distance and the controlled distance may be referred to as a distance-based offset value.

The processor 310 may measure a reflection time of the light between the electronic device 301 and the external object 302 spaced apart by the configured distance on the basis of the light of the predetermined frequency among the plurality of frequencies. The processor 310 may control the measured reflection time on the basis of calibration data for the reference frequency. The processor 310 may determine a deviation value between the controlled reflection time and the reflection time according to the real distance as an offset value for the reference frequency of the predetermined frequency. For each of the plurality of spaced distances between the electronic device 301 and the external object 302, the processor 310 may acquire the deviation value between the reflection time according to the real distance and the controlled reflection time as the offset value for the reference frequency of the predetermined frequency. The offset value acquired on the basis of the deviation value between the reflection time according to the real distance and the controlled reflection time may be referred to as a time-based offset value.

Figure 6:
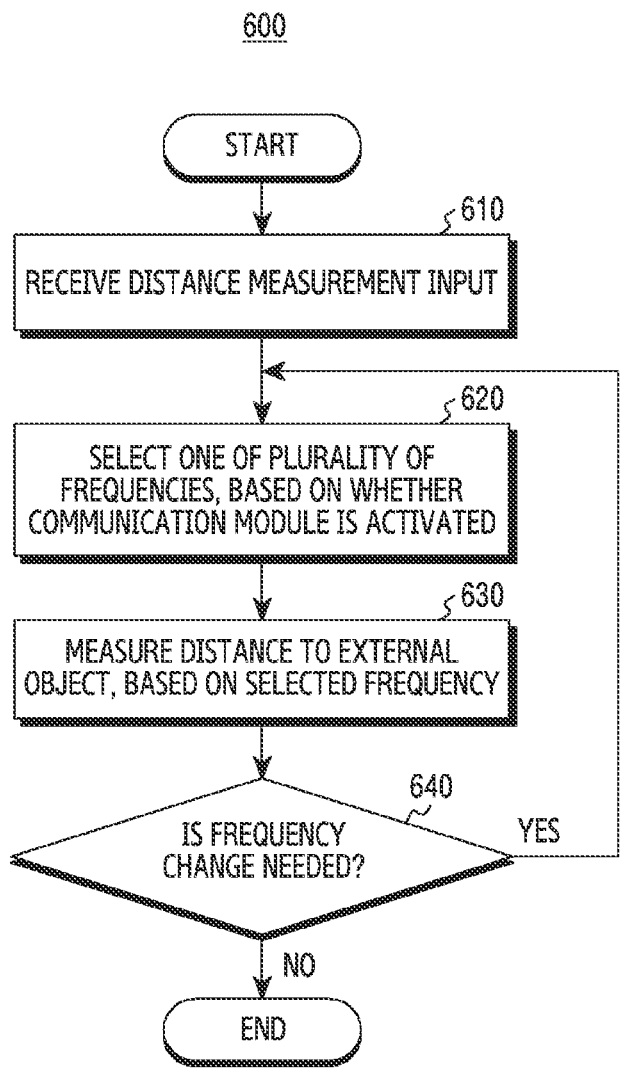
FIG. 6 is a flowchart illustrating a distance measurement operation of the electronic device, according to an embodiment.

FIG. 6 is a flowchart 600 illustrating a distance measurement operation of an electronic device, according to an embodiment. A description of FIG. 6 is made with reference to the configuration of the electronic device 301 of FIG. 3.

Referring to FIG. 6, in step 610, a 310 of the electronic device 301 receives a distance measurement input. The processor 310 may identify an input of selecting an object to which a distance is requested to be measured through a screen provided by a predetermined application as a distance measurement input. The processor 310 may identify an input of executing a predetermined application (for example, a camera application) as a distance measurement input. However, the distance measurement input is not limited thereto.

In step 620, the processor 310 selects one frequency from among a plurality of frequencies on the basis of whether a communication circuit is activated. The processor 310 may select one frequency from among a plurality of frequencies of emitted light 371 which can be emitted from a light source 350.

When it is identified that the communication module 320 is deactivated, the processor 310 may select a configured frequency from among the plurality of frequencies. The configured frequency may be a frequency selected in accordance with a previous distance measurement input. The configured frequency may be a default frequency. When it is identified that the communication module 320 is deactivated, the default frequency may be a frequency configured in advance to be used for distance measurement.

When it is identified that the communication module 320 is activated, the processor 310 may identify a frequency used by the communication module 320. The processor 310 may select one frequency from among the plurality of frequencies on the basis of the frequency used by the communication module 320. The processor 310 may determine a frequency distinguished from the frequency used by the communication module 320 among the plurality of frequencies of the emitted light 371 which can be emitted using the light source 350 as the frequency of the emitted light 371. The processor 310 may determine the frequency of the emitted light 371 such that the frequency used by the communication module 320 is distinguished from harmonics of the frequency of the emitted light 371.

In step 630, the processor 310 acquires information on a distance to an external object 302 on the basis of the emitted light 371 of the determined frequency.

Calibration data may be provided for each of the plurality of frequencies. When calibration data is provided for each of the plurality of frequencies, the processor 310 may not correct the acquired distance information.

In step 640, the processor 310 identifies whether there is a need to change the frequency of the emitted light 371. When the frequency used by the communication module 320 is changed, the processor 310 may identify that the change in the frequency of the emitted light 371 is needed. When it is identified that the changed frequency used by the communication module 320 corresponds to the selected frequency of the emitted light 371, the processor 310 may identify that the change in the frequency of the emitted light 371 is needed. When it is identified that the changed frequency used by the communication module 320 corresponds to one of the harmonics of the selected frequency of the emitted light 371, the processor 310 may identify that the change in the frequency of the emitted light 371 is needed.

When it is identified that the change in the frequency of the emitted light 371 is needed (YES in step 640), the processor 310 performs step 620 again. When it is identified that the change in the frequency of the emitted light 371 is not needed (NO in step 640), the processor 310 ends the process. In addition, when it is identified that the change in the frequency of the emitted light 371 is not needed (NO in step 640), the processor 310 may transfer the acquired distance information to an element (for example, an application) making a request for the input of measuring the distance to the external object 302 and end the process.

In FIG. 6, one distance measurement is performed on the basis of the distance measurement input. However, the processor 310 may acquire information on the distance to the external object 302 before a distance measurement end input is received and transfer the acquired distance information to an element (for example, an application) making the request for the input of measuring the distance. The distance measurement end input may correspond to an input of selecting an object making a request for ending the distance measurement through the screen provided by the predetermined application. The distance measurement end input may correspond to the input for ending the predetermined application (for example, a camera application). However, the distance measurement end input is not limited thereto.

Figure 7:
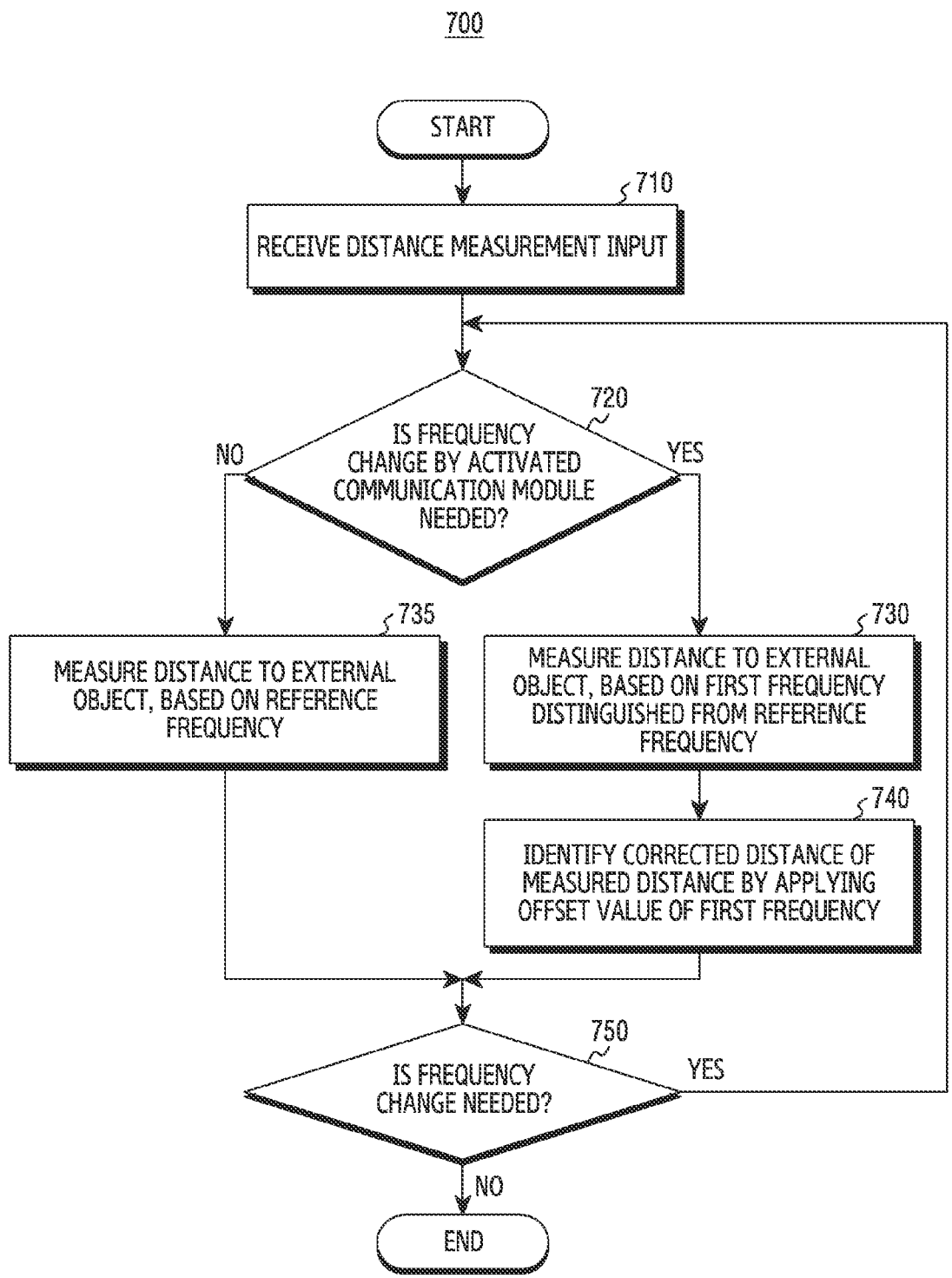
FIG. 7 is a flowchart illustrating a distance measurement operation of the electronic device, according to an embodiment.

FIG. 7 is a flowchart illustrating a distance measurement operation of the electronic device, according to an embodiment. A description of FIG. 7 is made with reference to the configuration of the electronic device 301 of FIG. 3.

Referring to FIG. 7, in step 710, a processor 310 of the electronic device 301 receives a distance measurement input. The processor 310 may identify an input of selecting an object to which a distance is requested to be measured through a screen provided by a predetermined application as a distance measurement input. The processor 310 may identify an input of executing a predetermined application (for example, a camera application) as a distance measurement input. However, the distance measurement input is not limited thereto.

In step 720, the processor 310 identifies whether a frequency change is needed by an activated communication module 320. The processor 310 may identify whether the communication module 320 is activated. When the communication module 320 is activated, the processor 310 may identify whether a frequency change is needed by the activated communication module 320.

The processor 310 may identify whether the frequency change is needed by the communication module 320 on the basis of the frequency used by the communication module 320. When it is identified that the frequency used by the communication module 320 corresponds to the configured frequency of the emitted light 371, the processor 310 may identify that the change in the frequency of the emitted light 371 is needed. When it is identified that the frequency used by the communication module 320 corresponds to one of the harmonics of the configured frequency of the emitted light 371, the processor 310 may identify that the change in the frequency of the emitted light 371 is needed.

When it is identified that the frequency change is needed by the activated communication module 320 (YES in step 720), the processor 310 performs step 730. When it is identified that the frequency change is not needed by the activated communication module 320 (NO in step 720), the processor 310 performs step 735. Additionally or alternatively, when it is identified that the communication module 320 is deactivated, the processor 310 may perform step 735.

That is, step 730 may be performed when it is identified that the communication module 320 is activated, and step 735 may be performed when it is identified that the communication module 320 is deactivated, but this is only an example. Additionally or alternatively, the processor 310 may perform step 730 or step 735 on the basis of possibility of deterioration of reception sensitivity of the activated communication module 320. The processor 310 may perform step 730 when the frequency used by the activated communication module 320 corresponds to a basic frequency, and perform step 735 when the frequency used by the activated communication module 320 does not correspond to a basic frequency. In addition, the processor 310 may perform step 730 when the frequency used by the activated communication module 320 corresponds to harmonics of the basic frequency and/or when the frequency used by the activated communication module 320 corresponds to the basic frequency, and perform step 735 when the frequency used by the activated communication module 320 does not correspond to harmonics of the basic frequency and/or when the frequency used by the activated communication module 320 does not correspond to the basic frequency.

In step 730, the processor 310 measures a distance to an external object 302 on the basis of a first frequency distinguished from the reference frequency. The processor 310 may acquire distance information on the basis of the measured distance. The measured distance may be a distance controlled on the basis of calibration data for the reference frequency. The reference frequency may be frequency for which calibration data is provided among a plurality of frequencies of emitted light 371 which can be emitted by a light source 350. In a plurality of frequencies, the number of reference frequencies may be one.

In step 740, the processor 310 identifies a corrected distance of the measured distance by applying an offset value of the first frequency. The offset value of the first frequency may be a value acquired in advance for the reference frequency.

When the offset value for the reference frequency of the first frequency includes one offset value for the reference distance, the processor 310 may identify a corrected distance by applying an offset value corrected by a ratio between the measured distance and the reference distance to the measured distance.

When the offset value for the reference frequency of the first frequency includes offset values for a plurality of reference distances for the reference frequency of the first frequency, the processor 310 may correct the offset value by a ratio between the measured distance and the reference distance corresponding to the measured distance among the plurality of reference distances and apply the corrected offset value to the measured distance so as to identify a corrected distance.

In step 750, the processor 310 identifies whether there is a need to change the frequency of the emitted light 371. When the frequency used by the communication module 320 is changed, the processor 310 may identify that the change in the frequency of the emitted light 371 is needed. When it is identified that the changed frequency used by the communication module 320 corresponds to the frequency of the emitted light 371, the processor 310 may identify that a change in the frequency of the emitted light 371 is needed. When it is identified that the changed frequency used by the communication module 320 corresponds to one of the harmonics of the frequency of the emitted light 371, the processor 310 may identify that the change in the frequency of the emitted light 371 is needed.

When it is identified that the change in the frequency of the emitted light 371 is needed (YES in step 750), the processor 310 performs step 720 again. When it is identified that the change in the frequency of the emitted light 371 is not needed (NO in step 750), the processor 310 ends the process. When it is identified that the change in the frequency of the emitted light 371 is not needed (NO in step 750), the processor 310 may transfer the acquired distance information to an element (for example, an application) making a request for the input of measuring the distance to the external object 302 and end the process.

Accordingly, one distance measurement may be performed on the basis of the distance measurement input. Additionally or alternatively, the processor 310 may acquire information on the distance to the external object 302 before a distance measurement end input is received and transfer the acquired distance information to an element (for example, an application) making the request for the input of measuring the distance. The distance measurement end input may correspond to an input of selecting an object making a request for ending the distance measurement through the screen provided by the predetermined application. The distance measurement end input may correspond to the input for ending the predetermined application (for example, a camera application). However, the distance measurement end input is not limited thereto.

The processor 310 measures the distance to the external object 302 on the basis of the reference frequency in step 735. The processor 310 may acquire distance information on the basis of the measured distance. The measured distance may be a distance controlled on the basis of calibration data for the reference frequency.

The processor 310 performs step 750 when step 735 is completed.

When the distance to the external object 302 is measured using the ToF module 340, the electronic device 301 and the method thereof may measure the distance to the external object 302 on the basis of light of a frequency distinguished from a frequency used by the communication circuit 320 and prevent deterioration of sensitivity of a reception signal of the communication circuit 320 if the communication circuit 320 is activated.

When the distance to the external object 302 is measured on the basis of light of a frequency having no calibration data through the ToF module 340, the electronic device 301 and the method thereof may reduce an error in distance measurement by applying the offset for the reference frequency of the corresponding frequency to the measured distance.

The electronic device 301 and the method thereof may prevent deterioration of sensitivity of a received signal of the communication circuit 320 and simultaneously reduce an error in distance measurement by including calibration data for each of frequencies which can be emitted by the light source 350 of the ToF module 340 and measuring the distance to the external object 302 on the basis of the light of the frequency distinguished from the frequency used by the communication circuit 320.

The electronic device may include a communication circuit, a light source configured to emit lights of configured frequencies, an image sensor configured to acquire reflected lights of the lights, a memory configured to store offset values for reference frequencies of the respective configured frequencies, and a processor, wherein the processor may be configured to receive a distance measurement input, identify whether the communication circuit is activated in response to the distance measurement input, determine that, in response to identification that the communication circuit is activated, a first frequency distinguished from a frequency used by the activated communication circuit is a frequency of the light among the configured frequencies, acquire information on a distance between the electronic device and an external object, based on the reflected light of the light of the first frequency, and acquire corrected distance information by applying an offset of the first frequency to the acquired distance information.

The frequency used by the activated communication circuit may be distinguished from harmonics of the first frequency.

The first frequency may be distinguished from a calibrated reference frequency.

The processor may be configured to determine that the reference frequency among the configured frequencies is the frequency of the light in response to identification that the communication circuit is deactivated, and acquire information on a distance between the external object and the electronic device, based on a reflected light of the light of the reference frequency.

The offset value for the reference frequency of each of the configured frequencies may be a distance-based offset value, and the processor may be configured to acquire the corrected distance information by applying a distance-based offset value of the first frequency to the acquired distance information.

The offset value for the reference frequency of each of the configured frequencies may be a time-based offset value, and the processor may be configured to acquire the corrected distance information by applying a time-based offset value of the first frequency to the acquired distance information.

The offset value for the reference frequency of each of the configured frequencies may be an offset value according to a reference distance, and the processor may be configured to correct the offset value according to the reference distance of the first frequency on the basis of the acquired distance information and acquire the corrected distance information by applying the corrected offset value to the acquired distance information.

The offset value for the reference frequency of each of the configured frequencies may be a reference distance-specific offset value for each reference distance, and the processor may be configured to identify a first offset value corresponding to a distance according to the distance information among reference distance-specific offset values of the first frequency and acquire the corrected distance information by applying the identified first offset value to the distance information.

The method of operating the electronic device may include receiving a distance measurement input, identifying whether a communication circuit of the electronic device is activated in response to the distance measurement input, determining that, in response to identification that the communication circuit is activated, a first frequency distinguished from a frequency used by the activated communication circuit is a frequency of the light among configured frequencies which can be emitted by a light source of the electronic device, acquiring information on a distance between the electronic device and an external object, based on a reflected light of the light of the first frequency, and acquiring corrected distance information by applying an offset for the reference frequency of the first frequency to the acquired distance information.

The frequency used by the activated communication circuit may be distinguished from harmonics of the first frequency.

The first frequency may be distinguished from a calibrated basic frequency.

The method may further include determining that the reference frequency among the configured frequencies is the frequency of the light in response to identification that the communication circuit is deactivated, and acquiring information on a distance between the external object and the electronic device, based on a reflected light of the light of the reference frequency.

The offset value for the reference frequency of the first frequency may be a distance-based offset value, and acquiring the corrected distance information may include acquiring the corrected distance information by applying a distance-based offset value of the first frequency to the distance information.

The offset value for the reference frequency of the first frequency may be a time-based offset value, and acquiring the corrected distance information may include acquiring the corrected distance information by applying a time-based offset value of the first frequency to the distance information.

The offset value for the reference frequency of each of the configured frequencies may be an offset value according to a reference distance, and acquiring the corrected distance information may include correcting the offset value according to the reference distance of the first frequency on the basis of the distance information and acquiring the corrected distance information by applying the corrected offset value to the distance information.

The offset value for the reference frequency of the first frequency may be a reference distance-specific offset value, and acquiring the corrected distance information may include identifying a first offset value corresponding to a distance according to the distance information among reference distance-specific offset values of the first frequency and acquiring the corrected distance information by applying the identified first offset value to the distance information.

The electronic device may include a communication circuit, a light source configured to emit lights of configured frequencies, an image sensor configured to acquire reflected lights of the lights, a memory configured to store offset values for reference frequencies of the respective configured frequencies, and a processor, wherein the processor may be configured to receive a distance measurement input, identify whether the communication circuit is activated in response to the distance measurement input, determine that, in response to identification that the communication circuit is activated, a first frequency distinguished from a frequency used by the activated communication circuit is a frequency of the light among the configured frequencies, calculate a distance between an external object and the electronic device on the basis of a reflected light of the light of the first frequency, and acquire distance information by applying calibration data for the first frequency to the calculated distance.

The frequency used by the activated communication circuit may be distinguished from harmonics of the first frequency.

The processor may be configured to determine that, in response to identification that the communication circuit is deactivated, a second frequency among the configured frequencies is a frequency of the light, calculate a distance between an external object and the electronic device on the basis of a reflected light of the light of the second frequency, and acquire distance information by applying calibration data for the second frequency to the calculated distance.

The processor may be configured to identify that the frequency used by the activated communication circuit is changed, identify whether, in response to identification that the frequency used by the activated communication circuit is changed, the change in the frequency of the light is needed, determine that, in response to identification that the change in the frequency of the light is needed, a third frequency distinguished from the changed frequency used by the activated communication circuit among the configured frequencies is the frequency of the light, calculate a distance between an external object and the electronic device on the basis of a reflected light of the light of the third frequency, and acquire distance information by applying calibration data for the third frequency to the calculated distance.

The electronic device may include a communication circuit, a light source configured to emit lights of configured frequencies, an image sensor configured to acquire reflected lights of the lights, and a processor 310, wherein the processor may be configured to identify whether the communication circuit is activated in response to reception of a distance measurement input, determine that, in response to identification that the communication circuit is activated, a first frequency distinguished from a frequency used by the activated communication circuit is a frequency of the light among the configured frequencies, and acquire information on a distance between the external object and the electronic device on the basis of a reflected light of the light of the first frequency.

The frequency used by the activated communication circuit may be distinguished from harmonics of the first frequency.

The processor may be configured to determine that the reference frequency among the configured frequencies is the frequency of the light in response to identification that the communication circuit is deactivated, and acquire information on a distance between the external object and the electronic device, based on a reflected light of the light of the reference frequency.

The electronic device may further include a memory configured to store an offset value for a reference frequency of each of the configured frequencies, and the processor may be configured to acquire corrected distance information by applying an offset value of the first frequency to the distance information in response to identification that the first frequency is distinguished from the reference frequency.

The offset value for the reference frequency of each of the configured frequencies may be a distance-based offset value, and the processor may be configured to acquire the corrected distance information by applying a distance-based offset value of the first frequency to the distance information in response to identification that the first frequency is distinguished from the reference frequency.

The offset value for the reference frequency of each of the configured frequencies may be a time-based offset value, and the processor may be configured to acquire the corrected distance information by applying a time-based offset value of the first frequency to the distance information in response to identification that the first frequency is distinguished from the reference frequency.

The offset value for the reference frequency of each of the configured frequencies may be an offset value according to a reference distance, and the processor may be configured to correct the offset value according to the reference distance of the first frequency on the basis of the distance information in response to identification that the first frequency is distinguished from the reference frequency and acquire the corrected distance information by applying the corrected offset value to the distance information.

The offset value for the reference frequency of each of the configured frequencies may be a reference distance-specific offset value, and the processor may be configured to identify a first offset value corresponding to a distance according to the distance information among reference distance-specific offset values of the first frequency and acquire the corrected distance information by applying the identified first offset value to the distance information.

The processor may be configured to identify whether a change in the frequency of the light is needed in response to identification that the frequency used by the activated communication circuit is changed, determine that a second frequency distinguished from the changed frequency used by the activated communication circuit is the frequency of the light in response to identification that the change in the frequency of the light is needed, and acquire information on the distance between the external object and the electronic device on the basis of a reflected light of the light of the second frequency.

The electronic device may further include a memory configured to store a calibration value of each of the configured frequencies, and the processor may be configured to acquire information on the distance between the external object and the electronic device by a calibration value of the first frequency.

Methods disclosed in the claims or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a CD-ROM, digital versatile discs (DVDs), or other type optical storage devices, or a magnetic cassette. Alternatively, any combination of some or all of the memories may form a memory in which the program is stored. Further, a plurality of such memories may be included in the electronic device.

In addition, the programs may be stored in an attachable storage device which may access the electronic device through communication networks such as the Internet, an Intranet, a local area network (LAN), a wide LAN (WLAN), and a storage area network (SAN) or a combination thereof. Such a storage device may access the electronic device via an external port. Further, a separate storage device on the communication network may access a portable electronic device.

An element included in the disclosure is expressed in the singular or the plural according to presented detailed embodiments. However, the singular form or plural form is selected appropriately to the presented situation for the convenience of description, and the disclosure is not limited by elements expressed in singular or plural forms. Therefore, either an element expressed in a plural form may also include a single element or an element expressed in a singular form may also include multiple elements.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a communication unit;
   a light source configured to emit light of configured frequencies;
   an image sensor configured to acquire reflected light of the emitted light;
   a memory configured to store offset values for reference frequencies of the respective configured frequencies; and
   a processor configured to:
   receive a distance measurement input,
   identify whether the communication circuit is activated in response to the distance measurement input,
   determine that, in response to identification that the communication circuit is activated, a first frequency distinguished from a frequency used by the activated communication circuit is a frequency of the emitted light among the configured frequencies,
   acquire information on a distance between the electronic device and an external object, based on the reflected light of the emitted light of the first frequency, and
   acquire corrected distance information by applying an offset of the first frequency to the acquired distance information.

2. The electronic device of claim 1, wherein the frequency used by the activated communication circuit is distinguished from harmonics of the first frequency.

3. The electronic device of claim 1, wherein the first frequency is distinguished from a calibrated basic frequency.

4. The electronic device of claim 1, wherein the processor is further configured to:
   determine that a reference frequency among the configured frequencies is the frequency of the emitted light in response to identifying that the communication circuit is deactivated, and
   acquire information on a distance between the external object and the electronic device, based on a reflected light of the emitted light of the reference frequency.

5. The electronic device of claim 1, wherein an offset value for a reference frequency of each of the configured frequencies is a distance-based offset value, and the processor is further configured to acquire the corrected distance information by applying a distance-based offset value of the first frequency to the acquired distance information.

6. The electronic device of claim 1, wherein an offset value for a reference frequency of each of the configured frequencies is a time-based offset value, and the processor is further configured to acquire the corrected distance information by applying a time-based offset value of the first frequency to the acquired distance information.

7. The electronic device of claim 1, wherein an offset value for a reference frequency of each of the configured frequencies is an offset value according to a reference distance, and the processor is further configured to correct the offset value according to the reference distance of the first frequency, based on the acquired distance information and acquire the corrected distance information by applying the corrected offset value to the acquired distance information.

8. The electronic device of claim 1, wherein an offset value for a reference frequency of each of the configured frequencies is a reference distance-specific offset value for each reference distance, and the processor is further configured to identify a first offset value corresponding to a distance according to the distance information among reference distance-specific offset values of the first frequency and acquire the corrected distance information by applying the identified first offset value to the distance information.

9. A method of operating an electronic device, the method comprising:
   receiving a distance measurement input;
   identifying whether a communication circuit of the electronic device is activated in response to the distance measurement input;
   determining that, in response to identification that the communication circuit is activated, a first frequency distinguished from a frequency used by the activated communication circuit is a frequency of light emitted among configured frequencies;
   acquiring information on a distance between the electronic device and an external object, based on a reflected light of the emitted light of the first frequency; and
   acquiring corrected distance information by applying an offset value for a reference frequency of the first frequency to the acquired distance information.

10. The method of claim 9, wherein the frequency used by the activated communication circuit is distinguished from harmonics of the first frequency.

11. The method of claim 9, wherein the first frequency is distinguished from a calibrated basic frequency.

12. The method of claim 9, further comprising:
determining that the reference frequency among the configured frequencies is the frequency of the emitted light in response to identifying that the communication circuit is deactivated; and
acquiring information on a distance between the external object and the electronic device, based on a reflected light of the emitted light of the reference frequency.

13. The method of claim 9, wherein the offset value for the reference frequency of the first frequency is a distance-based offset value, and acquiring the corrected distance information comprises acquiring the corrected distance information by applying a distance-based offset value of the first frequency to the distance information.

14. The method of claim 9, wherein the offset value for the reference frequency of the first frequency is a time-based offset value, and acquiring the corrected distance information comprises acquiring the corrected distance information by applying a time-based offset value of the first frequency to the distance information.

15. The method of claim 9, wherein the offset value for the reference frequency of each of the configured frequencies is an offset value according to a reference distance, and acquiring the corrected distance information comprises correcting the offset value according to the reference distance of the first frequency, based on the distance information and acquiring the corrected distance information by applying the corrected offset value to the distance information.

16. The method of claim 9, wherein the offset value for the reference frequency of each of the configured frequencies is a reference distance-specific offset value for each reference distance, and acquiring the corrected distance information comprises identifying a first offset value corresponding to a distance according to the distance information among reference distance-specific offset values of the first frequency and acquiring the corrected distance information by applying the identified first offset value to the distance information.

17. An electronic device comprising:
a communication circuit,
a light source configured to emit lights of configured frequencies,
an image sensor configured to acquire reflected lights of the emitted lights,
a memory configured to store offset values for reference frequencies of the respective configured frequencies, and
a processor configured to:
receive a distance measurement input,
identify whether the communication circuit is activated in response to the distance measurement input,
determine that, in response to identification that the communication circuit is activated, a first frequency distinguished from a frequency used by the activated communication circuit is a frequency of the emitted light among the configured frequencies,
calculate a distance between an external object and the electronic device on the basis of a reflected light of the emitted light of the first frequency, and
acquire distance information by applying calibration data for the first frequency to the calculated distance.

18. The electronic device of claim 17, wherein the frequency used by the activated communication circuit is distinguished from harmonics of the first frequency.

19. The electronic device of claim 17, wherein the processor is further configured to:
determine that, in response to identification that the communication circuit is deactivated, a second frequency among the configured frequencies is a frequency of the emitted light,
calculate a distance between an external object and the electronic device on the basis of a reflected light of the light of the second frequency, and
acquire distance information by applying calibration data for the second frequency to the calculated distance.

20. The electronic device of claim 19, wherein the processor is further configured to:
identify that the frequency used by the activated communication circuit is changed,
identify whether, in response to identification that the frequency used by the activated communication circuit is changed, the change in the frequency of the emitted light is needed,
determine that, in response to identification that the change in the frequency of the light is needed, a third frequency distinguished from the changed frequency used by the activated communication circuit among the configured frequencies is the frequency of the emitted light,
calculate a distance between an external object and the electronic device on the basis of a reflected light of the light of the third frequency, and
acquire distance information by applying calibration data for the third frequency to the calculated distance.

* * * * *